US012476057B2

(12) United States Patent
Ding et al.

(10) Patent No.: US 12,476,057 B2
(45) Date of Patent: Nov. 18, 2025

(54) CONTROL APPARATUS FOR LIFTING MECHANISM

(71) Applicant: ZHEJIANG JIECANG LINEAR MOTION TECHNOLOGY CO., LTD., Zhejiang (CN)

(72) Inventors: Miaojiang Ding, Shaoxing (CN); Yanjun Tong, Shaoxing (CN); Shaoping Zhou, Shaoxing (CN)

(73) Assignee: ZHEJIANG JIECANG LINEAR MOTION TECHNOLOGY CO., LTD., Shaoxing (CN)

( * ) Notice: Subject to any disclaimer, the term of this patent is extended or adjusted under 35 U.S.C. 154(b) by 70 days.

(21) Appl. No.: 18/271,356

(22) PCT Filed: Apr. 24, 2022

(86) PCT No.: PCT/CN2022/088650
§ 371 (c)(1),
(2) Date: Jul. 7, 2023

(87) PCT Pub. No.: WO2022/252870
PCT Pub. Date: Dec. 8, 2022

(65) Prior Publication Data
US 2024/0304400 A1 Sep. 12, 2024

(30) Foreign Application Priority Data
May 31, 2021 (CN) ......................... 202110599770.2

(51) Int. Cl.
*H01H 21/34* (2006.01)
*H01H 9/02* (2006.01)
*H01H 21/40* (2006.01)

(52) U.S. Cl.
CPC .......... *H01H 21/34* (2013.01); *H01H 9/0228* (2013.01); *H01H 21/40* (2013.01)

(58) Field of Classification Search
CPC ...... H01H 21/34; H01H 9/0228; H01H 21/40; H01H 21/22; H01H 9/0235; H01H 21/36; H01H 9/02
See application file for complete search history.

(56) References Cited

U.S. PATENT DOCUMENTS 6,750,406 B2 * 6/2004 Komatsu ................ H01H 21/22 200/1 B
11,019,218 B2 5/2021 Schaaf et al.
(Continued)

FOREIGN PATENT DOCUMENTS

CN 2845145 Y 12/2006
CN 201936790 U 8/2011
(Continued)

OTHER PUBLICATIONS

Jul. 5, 2022 International Search Report issued in International Patent Application No. PCT/CN2022/088650.
(Continued)

*Primary Examiner* — Lheiren Mae A Caroc
(74) *Attorney, Agent, or Firm* — Oliff PLC

(57) ABSTRACT

A control apparatus for a lifting mechanism, including: a mount box, a circuit board, and a toggle assembly, the circuit board including a lift switch which is elastically auto-reset and configured to control lifting, the toggle assembly being operable by pushing to close the lift switch. a limit portion is provided on each of two sidewalls of the toggle assembly, the limit portion being staggered with the lift switch along a depth direction of the toggle assembly and vertically movable with the toggle assembly; and a stop portion is provided on each of two sidewalls of the mount box; the toggle assembly includes a free state in which the stop portion vertically stops the limit portion and a pushed state in which the toggle assembly rotates about a pivot point
(Continued)

which is a contact point between the stop portion and the limit portion.

14 Claims, 5 Drawing Sheets

(56) References Cited

U.S. PATENT DOCUMENTS

| | | | | |
|---|---|---|---|---|
| 2013/0213787 | A1* | 8/2013 | Laicher | H01H 23/02 200/557 |
| 2019/0166256 | A1 | 5/2019 | Schaaf et al. | |

FOREIGN PATENT DOCUMENTS

| | | | |
|---|---|---|---|
| CN | 103367000 | A | 10/2013 |
| CN | 108402664 | A | 8/2018 |
| CN | 109842730 | A | 6/2019 |
| CN | 209561263 | U | 10/2019 |
| CN | 110520955 | A | 11/2019 |
| CN | 111128576 | A | 5/2020 |
| CN | 211404325 | U | 9/2020 |
| CN | 113421790 | A | 9/2021 |
| CN | 214956525 | U | 11/2021 |
| DE | 2230028 | A1 | 10/1973 |
| JP | 2011-129298 | A | 6/2011 |

OTHER PUBLICATIONS

Dec. 28, 2021 Office Action issued in Chinese Patent Application No. 202110599770.2.

Nov. 21, 2023 International Preliminary Report on Patentability issued in International Patent Application No. PCT/CN2022/088650.

Jun. 12, 2024 Search Report issued in European Patent Application No. 22814917.5.

* cited by examiner

CONTROL APPARATUS FOR LIFTING MECHANISM

FIELD

The disclosure relates to lifting control technologies, and more particularly relates to a control apparatus for a lifting mechanism.

BACKGROUND

Smart home has become increasingly popular with improvement in living standards. An automated lift platform is a power device commonly used in smart home, in which an electric motor is usually used as the power source and a control box is used to control the mechanical equipment for adjusting the lift platform. In order to facilitate adjustment of the lift platform between maximum and minimum lifting heights, an UP switch and a DOWN switch are provided on the control box, the underlying adjustment principle of which goes like this: when the UP switch is actuated, a microcontroller unit on the circuit board in the control box transmits an "UP" command to the control box which then controls the electric motor to rotate forward to drive the mechanic equipment to perform an "up-lifting" action; when the DOWN switch is actuated, the microcontroller unit on the circuit board in the control box transmits a "DOWN" command to the control box which then controls the electric motor to rotate reversely to drive the mechanical equipment to perform a "down-lifting" action.

A conventional control apparatus comprises a mount box and a toggle assembly disposed in the mount box, where a lift switch is activated by pushing the toggle assembly. A conventional toggle actuation structure relies on a shaft-hole fit structure, where a rotating shaft rotates in a rotary shaft hole to implement actuation of the toggle; however, limitation of the rotation stroke of the actuated toggle assembly relies only on the shaft hole; in addition, the shaft-hole fit structure is highly demanding on the fit dimension between the rotary shaft and the rotary shaft hole as well as their surface smoothness, which requires polishing treatment of the surfaces of the rotary shaft and the rotary shaft hole to avoid likely occurrence of jam or looseness.

SUMMARY

To overcome the above and other drawbacks in the prior art, a control apparatus for a lifting mechanism is provided.

A technical solution adopted by the disclosure is summarized below:

A control apparatus for a lifting mechanism, comprising: a mount box mounted on the lifting mechanism, a circuit board, and a toggle assembly partially extended into a depth of the mount box, the circuit board comprising a lift switch which is elastically auto-reset and configured to control lifting, the toggle assembly being operable by pushing to close the lift switch, wherein a limit portion is provided on each of two sidewalls of the toggle assembly, the limit portion being staggered with the lift switch along a depth direction of the toggle assembly, the limit portion being vertically movable with the toggle assembly; and a stop portion is provided on each of two sidewalls of the mount box;

wherein the toggle assembly comprises a free state and a pushed state, where in the free state, the stop portion vertically stops the limit portion, while in the pushed state, the toggle assembly rotates about a pivot point which is a contact point between the stop portion and the limit portion.

The disclosure offers an advantage below:

In the prior art, the shaft-hole fitting between the toggle assembly and the mount box renders the assembly inconvenient and requires a high fitting precision. In the disclosure, a stop portion-limit portion cooperating structure is provided between two sidewalls of the toggle assembly and two sidewalls of the mount box, the toggle assembly comprises a free state and a pushed state in the mount box, and the lift switch is of an elastically auto-reset structure. Accordingly, when the toggle assembly is in the free state, the lift switch is also in a free state, where the stop portion abuts against the limit portion to perform stoppage. To activate lifting, the toggle assembly is pushed to flip to press the lift switch, causing the end of the stop portion abutting against the limit portion to be disengaged, while the other end thereof still abuts against the limit portion to become a pivot point of rotating. Since the limit portion is staggered with the lift switch in the depth direction of the toggle assembly, when the lift switch is pressed to the maximum stroke, the two pivot points at two sides and the lift switch (three points in total) form a plane with a determined position, whereby a limit is formed to rotation of the toggle assembly; since the front and rear ends of the toggle assembly move vertically as the toggle assembly is pushed, the three points also perform limitation to the vertical movement stroke of the front and rear ends of the toggle assembly. In this way, the disclosure offers a higher limit strength and a better limit effect; in addition, the simple structure has a low demand on assembly precision and reduces assembly and manufacturing difficulty.

In some embodiments, the lift switch comprises an UP switch and a DOWN switch, the toggle assembly being operable by pushing to close the UP switch or the DOWN switch, the limit portion comprising a first limit portion disposed between the UP switch and the DOWN switch, and a second limit portion disposed between the first limit portion and the DOWN switch, the stop portion comprising a first stop portion cooperating with the first limit portion and a second stop portion cooperating with the second limit portion.

In some embodiments, the toggle assembly pushed up is operable to close the UP switch, the toggle assembly rotating about a pivot point which is a contact point between the second stop portion and the second limit portion; and wherein the toggle assembly pushed down is operable to close the DOWN switch, the toggle assembly rotating about a pivot point which is a contact between the first stop portion and the first limit portion.

In some embodiments, the toggle assembly is insert-fitted with the mount box.

In some embodiments, the limit portion refers to a snap-fit provided on a sidewall of the toggle assembly, a snap groove being provided on a sidewall of the mount box, the snap-fit being snapped into the snap groove and vertically movable in the snap groove, a stop portion vertically stopping the snap-fit being provided in the snap groove.

In some embodiments, a block portion configured to limit transverse movement of the toggle assembly is provided on a sidewall of the snap groove.

In some embodiments, the stop portion refers to a snap-fit provided on a sidewall of the mount box, a snap groove being provided on the toggle assembly, and a limit portion stopped by the snap-fit being provided in the snap groove.

In some embodiments, the snap-fit is an elastic snap-fit.

In some embodiments, the toggle assembly comprises an inserted portion extending in a depth of the mount box and a toggle portion exposed out of the mount box, the circuit board being disposed on the toggle assembly, an UP button pillar operable to close the UP switch and a DOWN button pillar operable to close the DOWN switch being provided in the mount box.

In some embodiments, the UP button pillar and the DOWN button pillar are disposed below the toggle assembly, such that the toggle portion is closer to the DOWN switch than to the UP switch; or, the UP button pillar and the DOWN button pillar are disposed above the toggle assembly, such that the toggle portion is closer to the UP switch than to the DOWN switch.

All of these features and advantages of the disclosure will be disclosed in detail through specific implementations described below with reference to the accompanying drawings.

BRIEF DESCRIPTION OF THE DRAWINGS

Hereinafter, the disclosure will be further described with reference to the accompanying drawings, in which.

REFERENCE SIGNS

Figure 1:
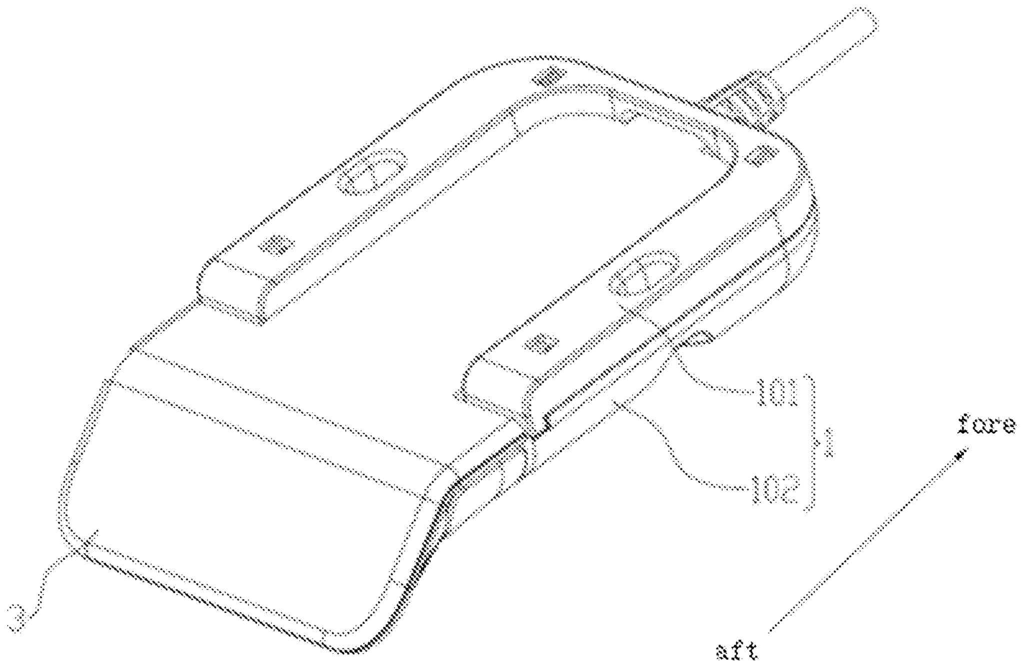
FIG. 1 is a stereoscopic structural schematic diagram of a control apparatus for a lifting mechanism in an embodiment of the disclosure.

1. mount box; 101. upper cover; 102. lower bracket; 1021. DOWN button pillar; 1022. UP button pillar; 1023. first snap groove; 1024. second snap groove; 1025. block portion;

2. circuit board; 201. Down switch; 202. UP switch;

3. toggle assembly; 301. inserted portion; 302. toggle portion; 303. through hole; 3*a*. upper housing; 3*b*. lower housing;

401. first snap-fit; 402. second snap-fit.

DETAILED DESCRIPTION

Hereinafter, the technical solutions of the disclosure will be explained and illustrated through embodiments with reference to the accompanying drawings. However, the embodiments are only preferred embodiments of the disclosure, not all of them. Other embodiments derived by those skilled in the art without exercise of inventive work based on the examples in the embodiments all fall within the protection scope of the disclosure.

In the description of the disclosure, it needs to be understood that the orientational or positional relationships indicated by the terms "center," "longitudinal," "transverse," "length," "width," "thickness," "upper," "lower," "front," "rear," "left," "right," "vertical," "horizontal," "top," "bottom," "inner," "clockwise," and "counterclockwise" refer to those orientational and positional relationships illustrated in the drawings, which are intended only for facilitating description of the disclosure and simplifying relevant depictions, but not for indicating or implying that the devices or elements compulsorily possess such specific orientations or are compulsorily configured and operated with the specific orientations; therefore, such terms should not be construed as limitations to the disclosure.

Besides, the terms "first" and "second" are only used for descriptive purposes, which shall not be construed as indicating or implying relative importance or implicitly indicating the number of technical features referred to. Therefore, the features limited by "first" and "second" may explicitly or implicitly include one or more of such features. In the description of the present disclosure, unless otherwise indicated, "plurality" indicates two or more.

In the disclosure, unless otherwise explicitly provided and limited, the terms such as "mount," "connect," "attach," and "fix" should be understood broadly, which, for example, may refer to a fixed connection, a detachable connection, or an integrated connection; which may be a mechanical connection or an electrical connection; which may be a direct connection or an indirect connection via an intermediate medium; which may also be a communication between the insides of two elements. To a person of ordinary skill in the art, specific meanings of the above terms in the disclosure may be construed based on specific situations.

In the disclosure, unless otherwise explicitly provided and limited, an expression that a first feature is "above" or "below" a second feature may refer to a direct contact between the first feature and the second feature or may refer to a scenario where although the first feature and the second feature do not contact directly, they contact via a further feature therebetween. Moreover, the expression that the first feature is "above" or "over" or "on" the second feature refers to a situation where the first feature is exactly or generally over the second feature or only refers to a situation that the horizontal height of the first feature is higher than the second feature. The expression that the first feature is "under" or "below" or "beneath" the second feature refers to a situation where the first feature is exactly or generally below the second feature or only refers to a situation that the horizontal height of the first feature is lower than the second feature.

Embodiment

Hereinafter, the disclosure will be explained in further detail through specific implementations with reference to the accompanying drawings.

As illustrated in FIGS. 1 through 8, a control apparatus for a lifting mechanism according to the disclosure comprises: a mount box 1 mounted on the lifting mechanism, a circuit board 2, and a toggle assembly 3 partially extended into a depth of the mount box 1; the circuit board 2 comprises a lift switch which is elastically auto-reset and configured to control lifting; the toggle assembly 3 is operable by pushing to close the lift switch; a limit portion is provided on each of two sidewalls of the toggle assembly 3, the limit portion being staggered with the lift switch along the depth direction of the toggle assembly 3, the limit portion being vertically movable with the toggle assembly 3; and a stop portion is provided on each of two sidewalls of the mount box 1.

The toggle assembly 3 comprises a free state and a pushed state, where in the free state, the stop portion vertically stops the limit portion, while in the pushed state, the toggle assembly 3 rotates about a pivot point which is a contact point between the stop portion and the limit portion.

In this embodiment, a stop portion-limit portion cooperating structure is provided between two sidewalls of the toggle assembly 3 and two sidewalls of the mount box 1, the toggle assembly 3 comprises a free state and a pushed state in the mount box, and the lift switch is of an elastically auto-reset structure. Accordingly, when the toggle assembly 3 is in the free state, the lift switch is also in a free state, where the stop portion abuts against the limit portion to perform stoppage. To activate lifting, the toggle assembly 3 is pushed to flip to press the lift switch, causing the end of the stop portion abutting against the limit portion to be disengaged, while the other end thereof still abuts against the limit portion to become a pivot point of rotating. Since the limit portion is staggered with the lift switch in the depth direction of the toggle assembly 3, when the lift switch is pressed to the maximum stroke, the two pivot points at two sides and the lift switch (three points in total) form a plane with a determined position, whereby a limit is formed to rotation of the toggle assembly 3; since the front and rear ends of the toggle assembly 3 move vertically as the toggle assembly 3 is pushed, the three points also perform limitation to the vertical movement stroke of the front and rear ends of the toggle assembly 3. In this way, a stop structure such formed by the stop portion and the limit portion offers a higher limit strength and a better limit effect; in addition, the simple structure facilitates assembly, has a low demand on assembly precision, and reduces assembly and manufacturing difficulty.

Figure 2:
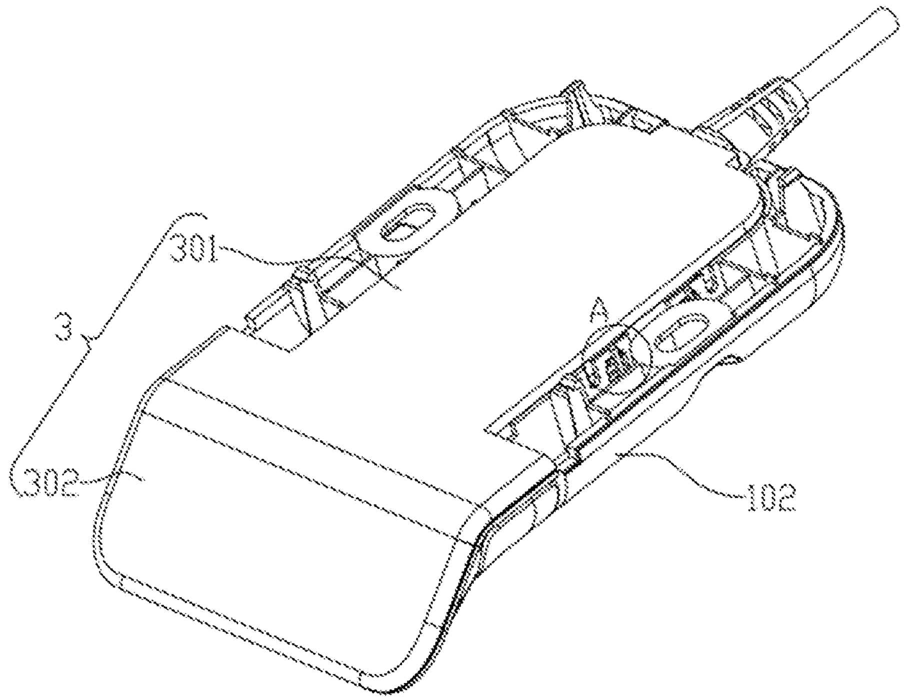
FIG. 2 is a stereoscopic structural schematic diagram of a control apparatus for a lifting mechanism with an upper cover removed in an embodiment of the disclosure.

As illustrated in FIG. 2, the toggle assembly 3 comprises an inserted portion 301 extended in a depth of the mount box 1 and a toggle portion 302 exposed out of the mount box 1, the circuit board 2 being disposed on the toggle assembly 3; specifically, the toggle assembly 3 comprises an outer housing 3*a* and a lower housing 3*b*, an accommodation cavity being formed between the upper housing 3*a* and the lower housing 3*b*, the circuit board 2 being disposed in the accommodation cavity.

Figure 6:
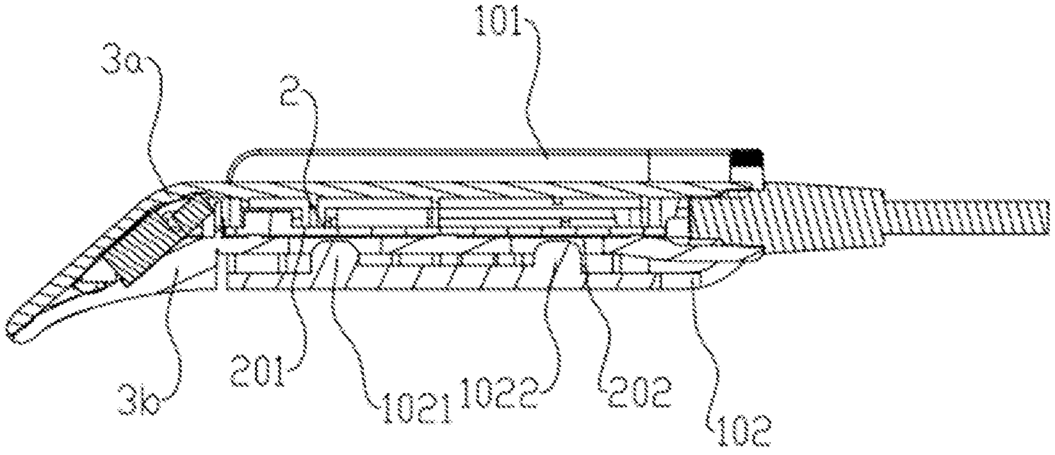
FIG. 6 is a sectional view taken in a line of A-A of FIG. 5.
Figure 7:
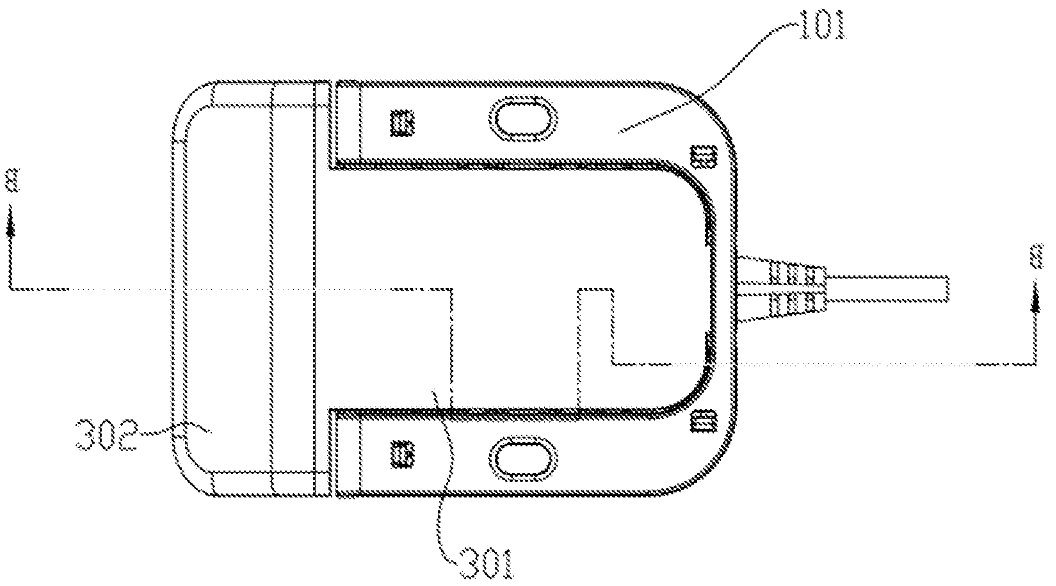
FIG. 7 is a top view of a control apparatus for a lifting mechanism in an embodiment of the disclosure.
Figure 8:
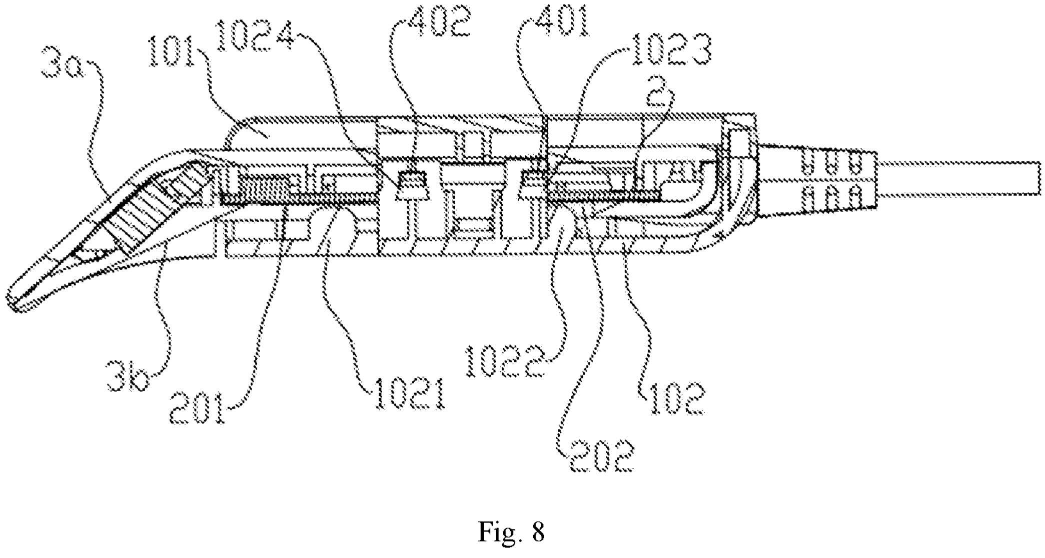
FIG. 8 is a sectional view partaken in a line of B-B of FIG. 7.

As illustrated in FIGS. 6 and 8, the lift switch on the circuit board 2 comprises an UP switch 202 and a DOWN switch 201, and an UP button pillar 1022 operable to close the UP switch 202 and a DOWN button pillar 1021 operable to close the DOWN switch 201 are provided in the mount box 1.

The toggle assembly 3 is operable by pushing to close the UP switch 202 or the DOWN switch 201. Specifically, the toggle assembly 3 is flipped to gradually approach the UP button pillar 1022 or the DOWN button pillar 1021, such that the corresponding button pillar gradually compresses the lift switch, whereby implementing closing of the lift switch.

Since up lifting and down lifting of a lift platform are reverse procedures and cannot be implemented simultaneously, the UP switch 202 and the DOWN switch 201 are separately controlled such that one action can only control one switch. Pushing up controls one of the UP switch 201 and the DOWN switch 201, while pushing down controls the other one thereof. To improve use safety, it is preferable that the toggle portion 302 closes the UP switch 202 when being pushed up and closes the DOWN switch 201 when being pushed down; if an obstacle exists in the periphery along the descending course of the lift platform, the obstacle will stop the bottom end of the toggle portion 302 when the lift platform descends to the obstacle, and then the inserted portion 301 continuously moves downward with the lift platform, which causes the toggle portion 302 to be pushed up, actuating the UP switch 202 to control the lifting platform to reverse to move upwardly, whereby potential damages caused by squeezing between the toggle assembly 3 and the obstacle is prevented. If an obstacle exists in the periphery along the ascending course of the lift platform, the working principle is similar to the case of the obstacle present in the periphery along the descending course, but the movement process is reverse, which will not be elaborated here. In view of the above, the lift platform enables automatic obstacle avoidance without an additional obstacle avoidance component, which simplifies the structure and reduces cost.

Since the push direction for closing the UP switch 202 is reverse to that of the DOWN switch 201, the pushing-up stroke and the pushing-down stroke need to be limited separately, where the limit portion comprises a first limit portion disposed between the UP switch 202 and the DOWN switch 201 and a second limit portion disposed between the first limit portion and the DOWN switch 201, and the stop portion comprises a first stop portion cooperating with the first limit portion and a second stop portion cooperating with the second limit portion. When the toggle assembly 3 is pushed up, the UP switch 202 is closed, where the toggle assembly 3 rotates about a pivot point which is the contact point between the second stop portion and the second limit portion; at which time, the first limit portion is disposed between the UP switch 202 and the second limit portion, such that the first limit portion moves with the UP switch 202 away from the first stop portion. When the toggle assembly 3 is pushed down, the DOWN switch 202 is closed, where the toggle assembly 3 rotates about a pivot point which is the contact point between the first stop portion and the first limit portion; since the second limit portion is disposed between the DOWN switch 201 and the first limit portion, the second limit portion moves with the UP switch 202 away from the second stop portion. The toggle assembly 3 rotates about different pivot points on closing the UP switch 202 and the DOWN switch 201; compared with conventional lift switches of providing a rotating axis in the middle, the rotating pivot points in this embodiment are more distant from the UP/DOWN switches and thus offer a larger rotating arm, such that given the toggle portion 302 travels a same vertical stroke, the toggle assembly 3 has a smaller rotation angle and thus a higher stability.

Hereinafter, the control apparatus for the lifting mechanism according to the disclosure will be described in detail with reference to the accompanying drawings:

As illustrated in FIGS. 1 to 8, according to an embodiment of the disclosure, the mount box 1 comprises an upper cover 101 and a lower bracket 102, both of which are fixedly mounted; the inserted portion 301 of the toggle assembly 3 is inserted in depth between the upper cover 101 and the lower bracket 102 and attached onto the lower bracket 102. The toggle assembly 3 is preferably insert-fitted with the lower bracket 102. Specifically, the limit portions refer to snap-fits disposed on sidewalls of the two sides of the toggle assembly 3, respectively, and snap grooves are provided on sidewalls of the two sides of the lower bracket 102, respectively, where the snap-fits are snapped into the snap grooves and are vertically movable therein.

To facilitate snapping the snap-fits into the snap grooves, the snap-fits preferably select elastic snap-fits in order to pop out again after being squeezed and compressed into the snap grooves, whereby the gap between the sidewalls of the toggle assembly 3 and the sidewalls of the mount box 1 is made as small as possible after the snap-fits are assembled, which reduces left-right sway of the toggle assembly 3. Meanwhile, as illustrated in FIG. 3, a block portion 1025 is provided at the outer side of each snap groove so as to transversely block the corresponding elastic snap-fit, whereby the left-right sway of the toggle assembly 3 is limited, which improves horizontal stability of the toggle assembly 3 in the mount box 1.

Figure 3:
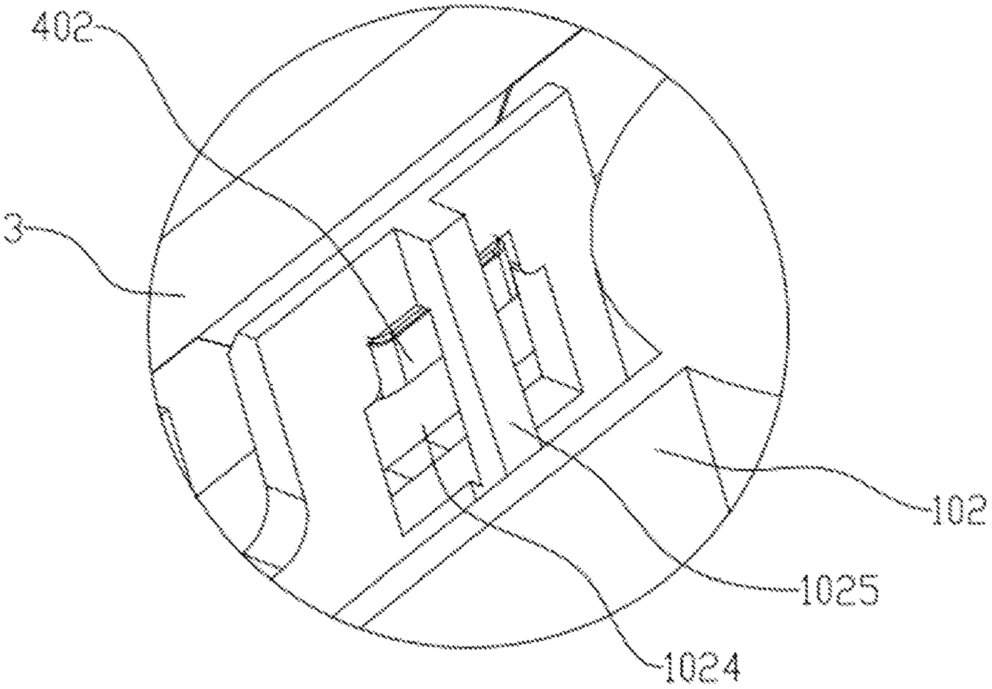
FIG. 3 is an enlarged view of part A of FIG. 2.

As illustrated in FIGS. 3 and 8, a stop portion vertically stopping the snap-fit is provided in each snap groove. Preferably, the stop portion is formed on the upper wall or lower wall of the snap groove, eliminating a need of additionally providing another stop portion, which simplifies the structure and reduces cost; meanwhile, the two sidewalls of the snap groove also play a role of limiting the front and rear ends of the corresponding snap-fit, whereby fore-and-aft movement of the toggle assembly 3 is limited.

The toggle assembly 3 is transversely limited by the block portions 1025 and the two sidewalls of the snap grooves such that the toggle assembly 3 can only move vertically.

Figure 4:
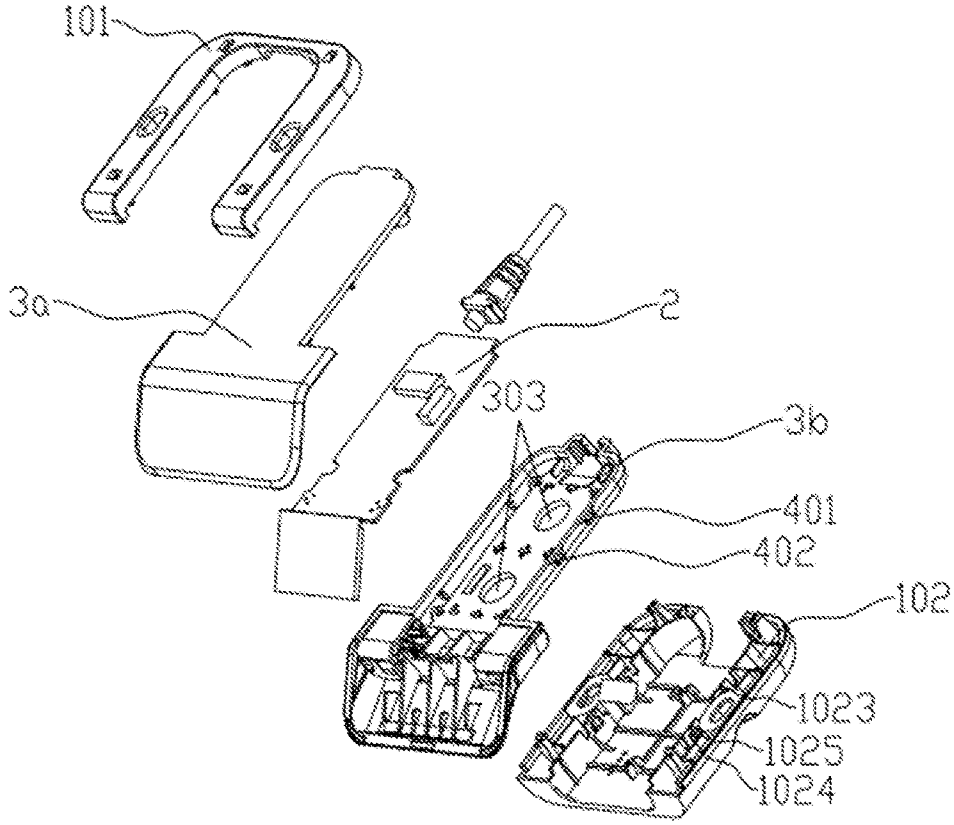
FIG. 4 is an exploded view of a control apparatus for a lifting mechanism in an embodiment of the disclosure.
Figure 5:
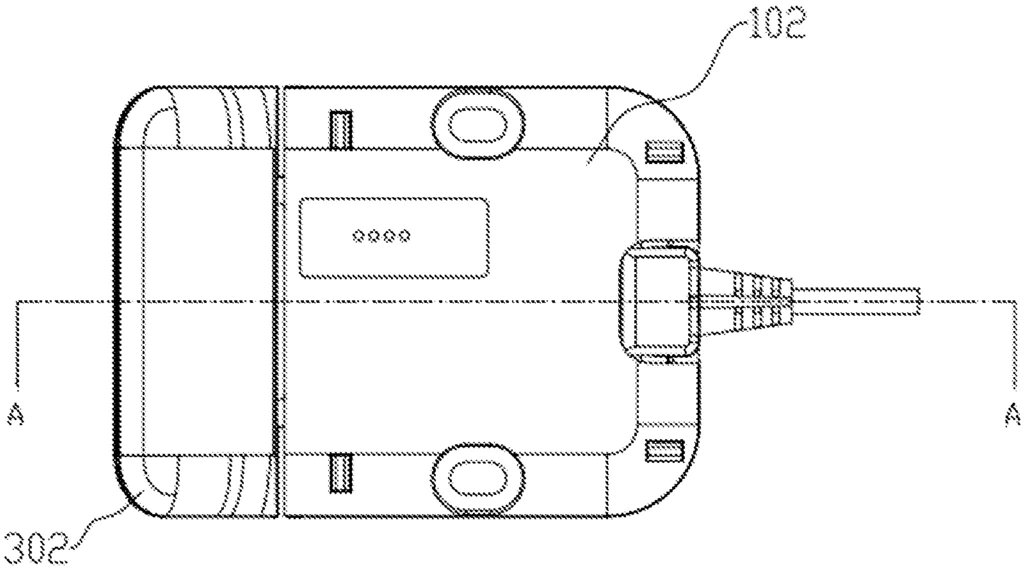
FIG. 5 is a bottom view of a control apparatus for a lifting mechanism in an embodiment of the disclosure.

To conform more to assembly routines and user habits, in this embodiment, as illustrated in FIGS. 6 and 8, the UP button pillar 1022 and the DOWN button pillar 1021 are disposed below the toggle assembly 3, i.e., disposed above the lower bracket 102; the toggle portion 302 is closer to the DOWN switch 201 than to the UP switch 202, as illustrated in FIG. 4; through holes 303 for the UP button pillar 1022 and DOWN button pillar 1021 to pass through are provided in the lower housing **3*b***.

To cooperate with the UP switch 202 and the DOWN switch 201, respectively, as illustrated in FIGS. 2 to 4 and 8, a first snap-fit 401 as the first limit portion and a second snap-fit 402 as the second limit portion are provided on the sidewalls of the toggle assembly 3, respectively, where the first snap-fit 401 is disposed between the UP switch 202 and the DOWN switch 201, and the second snap-fit 402 is disposed between the first snap-fit 401 and the DOWN switch 201; a first snap groove 1023 for the first snap-fit 401 to be snapped into and a second snap groove 1024 for the second snap-fit 402 to be snapped into are provided on sidewalls of the lower bracket 102, respectively, where the first stop portion is formed on the upper wall of the first snap groove 1023 and the second stop portion is formed on the upper wall of the second snap groove 1024.

Figure 9:
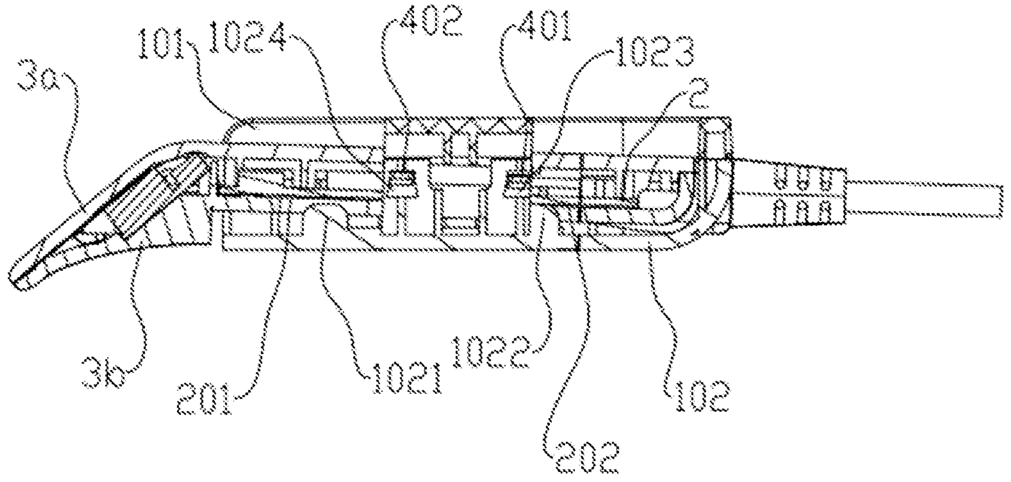
FIG. 9 is a sectional view of a control apparatus for a lifting mechanism in an embodiment of the disclosure, where a toggle assembly is in a pushed-up state.
Figure 10:
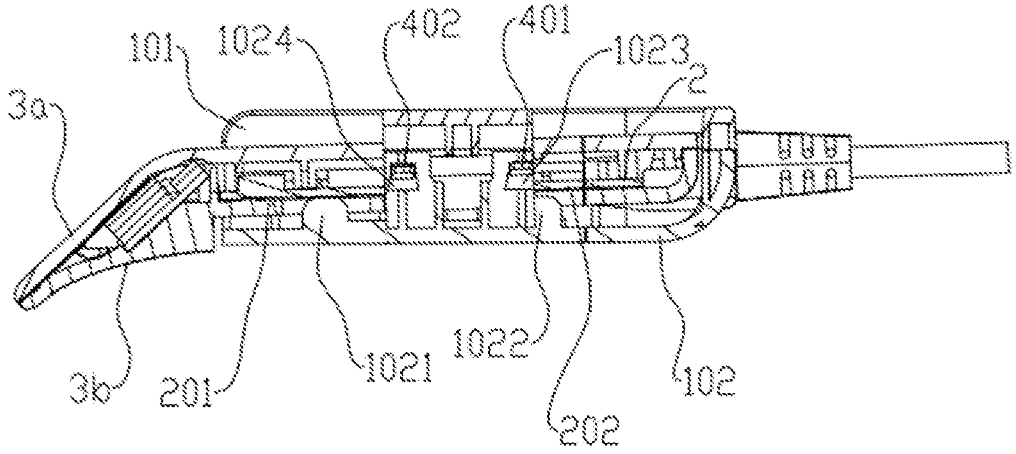
FIG. 10 is a sectional view of a control apparatus for a lifting mechanism in an embodiment of the disclosure, where a toggle assembly is in a pushed-down state.

In the free state, the UP switch 202 is disposed over the UP button pillar 1022, and the DOWN switch 201 is disposed over the DOWN button pillar 1021. Since the UP switch 202 and the DOWN switch 201 are elastic switches, the toggle assembly 3 may be lifted up such that the first snap-fit 401 abuts against the upper wall of the first snap groove 1023 and the second snap-fit 402 abuts against the upper wall of the second snap groove 1024. When being pushed down, as illustrated in FIG. 10, the toggle assembly 3 rotates about the pivot point which is the contact point between the first snap-fit 401 and the front side of the first snap groove 1023, causing the DOWN switch 201 to move downward, and the second snap-fit 402 also moves downward in the second snap groove 1024; during the downward moving process, the DOWN switch 201 is deformed due to obstruction by the DOWN button pillar 1021; when a deformation amount of the DOWN switch 201 reaches a stroke of switching on the DOWN switch 201, a down-lifting signal is emitted. When being pushed up, as illustrated in FIG. 9, the toggle assembly 3 rotates about a pivot point which is the contact point between the second snap-fit 402 and the rear side of the second snoop groove 1024, causing the UP switch 202 to move downward, and the first snap-fit 401 also moves downward in the first snap groove 1023; during the downward moving process, the UP switch 202 is deformed due to obstruction by the UP button pillar 1022; when a deformation amount of the UP switch 202 reaches a stroke of switching on the UP switch 202, an up-lifting signal is emitted. The elastic switches offer a comfortable hand for the downward movement of the toggle assembly 3.

The cooperating structure featuring due snap-fits and dual snap grooves realizes mounting and actuation of the toggle assembly 3 in the mount box 1 and offers a more precise and reliable vertical limit; during the actuation process, only the contact point between the upper side surface of the corresponding snap-fit and the upper wall of the corresponding snap groove is stressed; therefore, the lower side of the snap-fit may be manufactured with a large enough fitting chamfer, further facilitating assembly between parts, and meanwhile, the conventional rotating shaft structure is abandoned, eliminating a rotating shaft friction which deteriorates hand.

Of course, in alternative embodiments, the snap grooves may also be provided on the upper cover.

According to an embodiment of the disclosure, the stop portion may also be a snap-fit provided on a sidewall of the mount box; a snap groove is provided on the toggle assembly, and a limit portion stopped by the snap-fit is provided in the snap groove.

According to an embodiment of the disclosure, the limit portion may alternatively be a sliding block provided on a sidewall of the toggle assembly, a slide groove is provided on a sidewall of the mount box, and a stop portion is provided at an end portion of the slide groove; or, the stop portion may alternatively be a sliding block provided on a sidewall of the mount box, a slide groove is provided on a sidewall of the toggle assembly, and a limit portion is provided at an end portion of the slide groove.

According to an embodiment of the disclosure, the UP button pillar and the DOWN button pillar are disposed above the toggle assembly, and in this case, the toggle portion is closer to the UP switch than to the DOWN switch.

According to an embodiment of the disclosure, the toggle assembly may be alternatively configured such that when the toggle portion is pushed up, the DOWN switch is closed, and when the toggle portion is pushed down, the UP switch is closed; in this case, the positions of the UP switch and DOWN switch and the positions of the UP button pillar and DOWN button pillar may also be adjusted correspondingly dependent on operation needs.

What have been described above are only embodiments of the disclosure; however, the protection scope of the disclosure is not limited thereto. A person skilled in the art should understand that the disclosure includes, but is not limited to, the contents described in the drawings and the embodiments. Any modifications without departing from the functions and structural principles of the disclosure will be included within the scope of the claims.

We claim:

1. A control apparatus for a lifting mechanism, comprising: a mount box mounted on the lifting mechanism, a circuit board, and a toggle assembly partially extended into a depth of the mount box, the circuit board comprising a lift switch which is elastically auto-reset and configured to control lifting, the toggle assembly being operable by pushing to close the lift switch, wherein a limit portion is provided on each of two sidewalls of the toggle assembly, the limit portion being staggered with the lift switch along a depth direction of the toggle assembly, the limit portion being vertically movable with the toggle assembly; and a stop portion is provided on each of two sidewalls of the mount box;

wherein the toggle assembly comprises a free state and a pushed state, where in the free state, the stop portion vertically stops the limit portion, while in the pushed state, the toggle assembly rotates about a pivot point which is a contact point between the stop portion and the limit portion;

and wherein the lift switch comprises an UP switch and a DOWN switch, the toggle assembly being operable by pushing to close the UP switch or the DOWN switch, the limit portion comprising a first limit portion disposed between the UP switch and the DOWN switch, and a second limit portion disposed between the first limit portion and the DOWN switch, the stop portion comprising a first stop portion cooperating with the first limit portion and a second stop portion cooperating with the second limit portion.

2. The control apparatus for the lifting mechanism according to claim 1, wherein the toggle assembly pushed up is operable to close the UP switch, the toggle assembly rotating about a pivot point which is a contact point between the second stop portion and the second limit portion; and wherein the toggle assembly pushed down is operable to close the DOWN switch, the toggle assembly rotating about a pivot point which is a contact between the first stop portion and the first limit portion.

3. The control apparatus for the lifting mechanism according to claim 1, wherein the toggle assembly is insert-fitted with the mount box.

4. The control apparatus for the lifting mechanism according to claim 3, wherein the first limit portion refers to a first snap-fit provided on a sidewall of the toggle assembly, the second limit portion refers to a second snap-fit provided on a sidewall of the toggle assembly, the mount box comprises an upper cover and a lower bracket, a first snap groove and a second snap groove are provided on sidewalls of the lower bracket, where the first snap-fit is snapped into the first snap groove and vertically movable therein, the second snap-fit is snapped into the second snap groove and vertically movable therein, the first stop portion is formed on an upper wall of the first snap groove and the second stop portion is formed on an upper wall of the second snap groove.

5. The control apparatus for the lifting mechanism according to claim 4, wherein a block portion configured to limit transverse movement of the toggle assembly is provided on a sidewall of the first snap groove.

6. The control apparatus for the lifting mechanism according to claim 5, wherein the first snap-fit is an elastic snap-fit.

7. The control apparatus for the lifting mechanism according to claim 6, wherein the second snap-fit is an elastic snap-fit.

8. The control apparatus for the lifting mechanism according to claim 6, wherein the toggle assembly comprises an inserted portion extending in a depth of the mount box and a toggle portion exposed out of the mount box, the circuit board being disposed on the toggle assembly, an UP button pillar operable to close the UP switch and a DOWN button pillar operable to close the DOWN switch being provided in the mount box.

9. The control apparatus for the lifting mechanism according to claim 8, wherein the UP button pillar and the DOWN button pillar are disposed below the toggle assembly, such that the toggle portion is closer to the DOWN switch than to the UP switch; or, the UP button pillar and the DOWN button pillar are disposed above the toggle assembly, such that the toggle portion is closer to the UP switch than to the DOWN switch.

10. The control apparatus for the lifting mechanism according to claim 5, wherein the toggle assembly comprises an inserted portion extending in a depth of the mount box and a toggle portion exposed out of the mount box, the circuit board being disposed on the toggle assembly, an UP button pillar operable to close the UP switch and a DOWN button pillar operable to close the DOWN switch being provided in the mount box.

11. The control apparatus for the lifting mechanism according to claim 10, wherein the UP button pillar and the DOWN button pillar are disposed below the toggle assembly, such that the toggle portion is closer to the DOWN switch than to the UP switch; or, the UP button pillar and the DOWN button pillar are disposed above the toggle assembly, such that the toggle portion is closer to the UP switch than to the DOWN switch.

12. The control apparatus for the lifting mechanism according to claim 4, wherein the snap-fit is an elastic first snap-fit.

13. The control apparatus for the lifting mechanism according to claim 4, wherein the toggle assembly comprises an inserted portion extending in a depth of the mount box and a toggle portion exposed out of the mount box, the circuit board being disposed on the toggle assembly, an UP button pillar operable to close the UP switch and a DOWN button pillar operable to close the DOWN switch being provided in the mount box.

14. The control apparatus for the lifting mechanism according to claim 13, wherein the UP button pillar and the DOWN button pillar are disposed below the toggle assembly, such that the toggle portion is closer to the DOWN switch than to the UP switch; or, the UP button pillar and the DOWN button pillar are disposed above the toggle assembly, such that the toggle portion is closer to the UP switch than to the DOWN switch.

* * * * *